US009780821B2

(12) United States Patent
Li

(10) Patent No.: US 9,780,821 B2
(45) Date of Patent: Oct. 3, 2017

(54) SYSTEM AND METHOD FOR PORTABLE INFOTAINMENT VIA DYNAMIC SIM TWINNING WITH TEMPORARY SERVICE PLAN TRANSFERRING IN CONNECTED CAR

(71) Applicant: Samsung Electronics Co., Ltd., Suwon-si, Gyeonggi-do (KR)

(72) Inventor: Zhiyun Li, Kenmore, WA (US)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 14/530,485

(22) Filed: Oct. 31, 2014

(65) Prior Publication Data
US 2016/0126995 A1 May 5, 2016

(51) Int. Cl.
*H04B 1/3816* (2015.01)
*H04W 68/00* (2009.01)
*H04L 29/08* (2006.01)
*H04W 8/18* (2009.01)
H04W 8/00 (2009.01)
H04W 8/20 (2009.01)
H04W 76/02 (2009.01)
H04W 88/04 (2009.01)

(52) U.S. Cl.
CPC ........... *H04B 1/3816* (2013.01); *H04L 67/12* (2013.01); *H04W 8/183* (2013.01); *H04W 68/005* (2013.01); *H04W 8/005* (2013.01); *H04W 8/205* (2013.01); *H04W 76/023* (2013.01); *H04W 88/04* (2013.01)

(58) Field of Classification Search
CPC ...... H04B 1/3816; H04L 67/12; H04W 8/005; H04W 68/005
See application file for complete search history.

(56) References Cited

U.S. PATENT DOCUMENTS

| | | | |
|---|---|---|---|
| 7,702,312 B2 * | 4/2010 | Bollmann | H04M 1/6091 235/380 |
| 2003/0096641 A1 * | 5/2003 | Odinak | H04M 1/6075 455/569.2 |
| 2006/0166695 A1 * | 7/2006 | Morich | H04W 8/06 455/550.1 |
| 2011/0053506 A1 | 3/2011 | Lemke et al. | |
| 2012/0094657 A1 | 4/2012 | Gullapalli et al. | |

(Continued)

OTHER PUBLICATIONS

English Translation of CN 20444483.*
International Search Report and Written Opinion issued for PCT/KR2015/011085 dated Feb. 12, 2016, 8 pgs.

*Primary Examiner* — Olumide T Ajibade Akonai
*Assistant Examiner* — Eboni Hughes

(57) ABSTRACT

An apparatus comprises processing circuitry configured to determine that a primary user equipment (UE) entered a vehicle. The processing circuitry is configured to initiates transmission of an entrance notification to a carrier network server notifying that the primary UE entered the vehicle. The processing circuitry is configured to receive an assignment message from the carrier network server. The assignment message indicates that twinning has been configured between the primary UE and the apparatus. The twinning configuration includes a transfer of assignment of a service plan corresponding to the primary UE from the primary UE to the apparatus.

20 Claims, 6 Drawing Sheets

(56) References Cited

U.S. PATENT DOCUMENTS

| | | | |
|---|---|---|---|
| 2012/0142367 A1* | 6/2012 | Przybylski | H04W 4/046 455/456.1 |
| 2014/0068713 A1 | 3/2014 | Nicholson et al. | |
| 2014/0079217 A1 | 3/2014 | Bai et al. | |
| 2014/0199989 A1* | 7/2014 | Cepuran | H04W 48/14 455/422.1 |
| 2014/0295817 A1 | 10/2014 | Blanda et al. | |

* cited by examiner

SYSTEM AND METHOD FOR PORTABLE INFOTAINMENT VIA DYNAMIC SIM TWINNING WITH TEMPORARY SERVICE PLAN TRANSFERRING IN CONNECTED CAR

TECHNICAL FIELD

The present application relates generally to communication systems and, more specifically, to portable infotainment via dynamic subscriber identity module (SIM) twinning and temporary service plan transferring.

BACKGROUND

In-vehicle infotainment (IVI) systems can be generally classified as two categories: a) standalone unit, and b) bridged unit. The standalone IVI system receives its infotainment service through its own communication module with its own service plan. The standalone IVI system does not require a smartphone or a connection to a smartphone. The infotainment service plan of the standalone IVI system is bound with the vehicle and is not portable. Therefore, the standalone IVI system cannot support multiple users. The bridged IVI system depends on a paired smartphone as a bridge to receive its infotainment service. The smartphone can be paired with the bridged IVI system using wired or wireless connections, through which the smartphone provides the communication, processes data, and streams content for the head unit of the bridged IVI system to playback. The smartphone can also project a graphical user interface (GUI) to the head unit of the bridged IVI system and process user interactions or user inputs from the head unit. In the bridged IVI system, the infotainment service plan is bound to the smartphone and portable. This bridged IVI system supports multiple users, but the performance of this system is limited by the paired smartphone and the connection between the bridged IVI system and paired smartphone.

The user of a standalone IVI system may not desire the additional management responsibilities of managing a service plan for the smartphone and a second, separate service plan for the standalone IVI system. Also, when making a call from the standalone NI system, the user may prefer to keep the phone number associated with the second, separate service plan private from the recipient of the call, and instead provide a different phone number, such as the phone number associated with the smartphone, to the recipient of the call. The owner of a vehicle having a standalone NI system may desire to allow a family member to borrow the car, yet not allow the borrower to use the second, separate service plan for the standalone IVI system.

SUMMARY

In a first embodiment, an apparatus comprises processing circuitry configured to determine that a primary user equipment (UE) entered a vehicle. The processing circuitry is configured to initiates transmission of an entrance notification to a carrier network server notifying that the primary UE entered the vehicle. The processing circuitry is configured to receive an assignment message from the carrier network server. The assignment message indicates that twinning has been configured between the primary UE and the apparatus. The twinning configuration includes a transfer of assignment of a service plan corresponding to the primary UE from the primary UE to the apparatus.

In a second embodiment, a system includes processing circuitry configured to receive an entrance notification notifying that a primary user equipment (UE) entered a vehicle. The processing circuitry of the system is configured to locate a buddy SIM in the vehicle. The processing circuitry of the system is configured to twin the buddy SIM with a primary SIM within the primary UE. Also, the processing circuitry of the system is configured to initiate transmission of an assignment message indicating that twinning has been configured between the primary UE and the buddy SIM. The twinning configuration includes a transfer of assignment of a service plan corresponding to the primary UE from the primary SIM to the buddy SIM.

In a third embodiment, a method includes receiving an entrance notification notifying that a primary user equipment (UE) entered a vehicle. The method includes locating a buddy SIM in the vehicle. The method includes twining the buddy SIM with a primary SIM within the primary UE. The method also includes initiating transmission of an assignment message indicating that twinning has been configured between the primary UE and the buddy SIM. The twinning configuration includes a transfer of assignment of a service plan corresponding to the primary UE from the primary SIM to the buddy SIM.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 6, discussed below, and the various embodiments used to describe the principles of the present invention in this patent document are by way of illustration only and should not be construed in any way to limit the scope of the disclosure. Those skilled in the art will understand that the principles of this disclosure may be implemented in any suitably arranged device or system.

Figure 1:
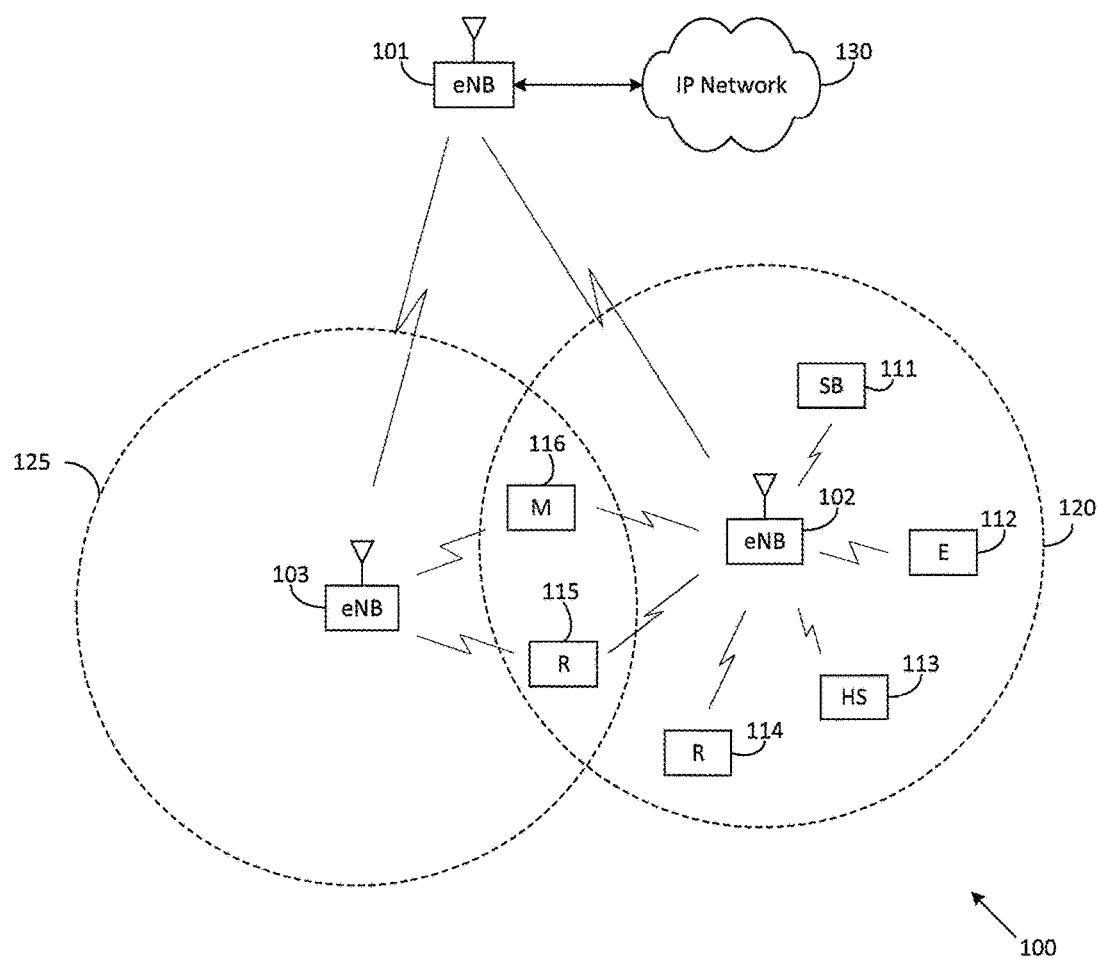
FIG. 1 illustrates an example wireless network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, embodiments of the present disclosure enable native connectivity, control, and playback on the head unit of an IVI system without managing a separate Subscriber Identity Module (SIM) plan. Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2A:
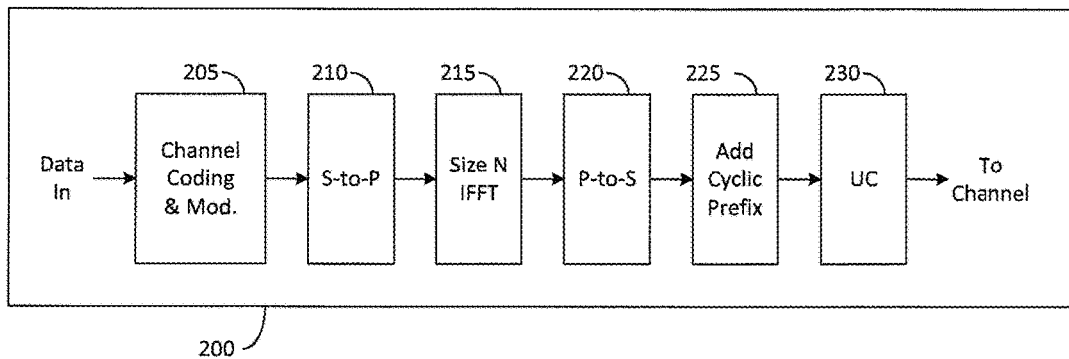
FIGS. 2A and 2B illustrate example wireless transmit and receive paths according to this disclosure.
Figure 2B:
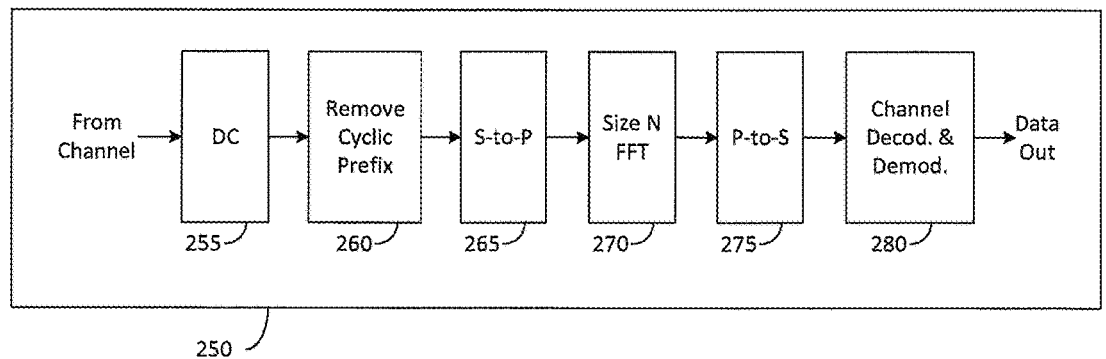

FIGS. 2A and 2B illustrate example wireless transmit and receive paths according to this disclosure. In the following description, a transmit path 200 may be described as being implemented in an eNB (such as eNB 102), while a receive path 250 may be described as being implemented in a UE (such as UE 116). However, it will be understood that the receive path 250 could be implemented in an eNB and that the transmit path 200 could be implemented in a UE. In some embodiments, the transmit path 200 and receive path 250 are configured to enable native connectivity, control, and playback on the head unit of an IVI system without managing a separate SIM plan.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the eNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal. The up-converter 230 modulates (such as up-converts) the output of the add cyclic prefix block 225 to an RF frequency for transmission via a wireless channel. The signal may also be filtered at baseband before conversion to the RF frequency.

A transmitted RF signal from the eNB 102 arrives at the UE 116 after passing through the wireless channel, and reverse operations to those at the eNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the eNBs 101-103 may implement a transmit path 200 that is analogous to transmitting in the downlink to UEs 111-116 and may implement a receive path 250 that is analogous to receiving in the uplink from UEs 111-116. Similarly, each of UEs 111-116 may implement a transmit path 200 for transmitting in the uplink to eNBs 101-103 and may implement a receive path 250 for receiving in the downlink from eNBs 101-103.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, could be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Any other suitable architectures could be used to support wireless communications in a wireless network.

Figure 3:
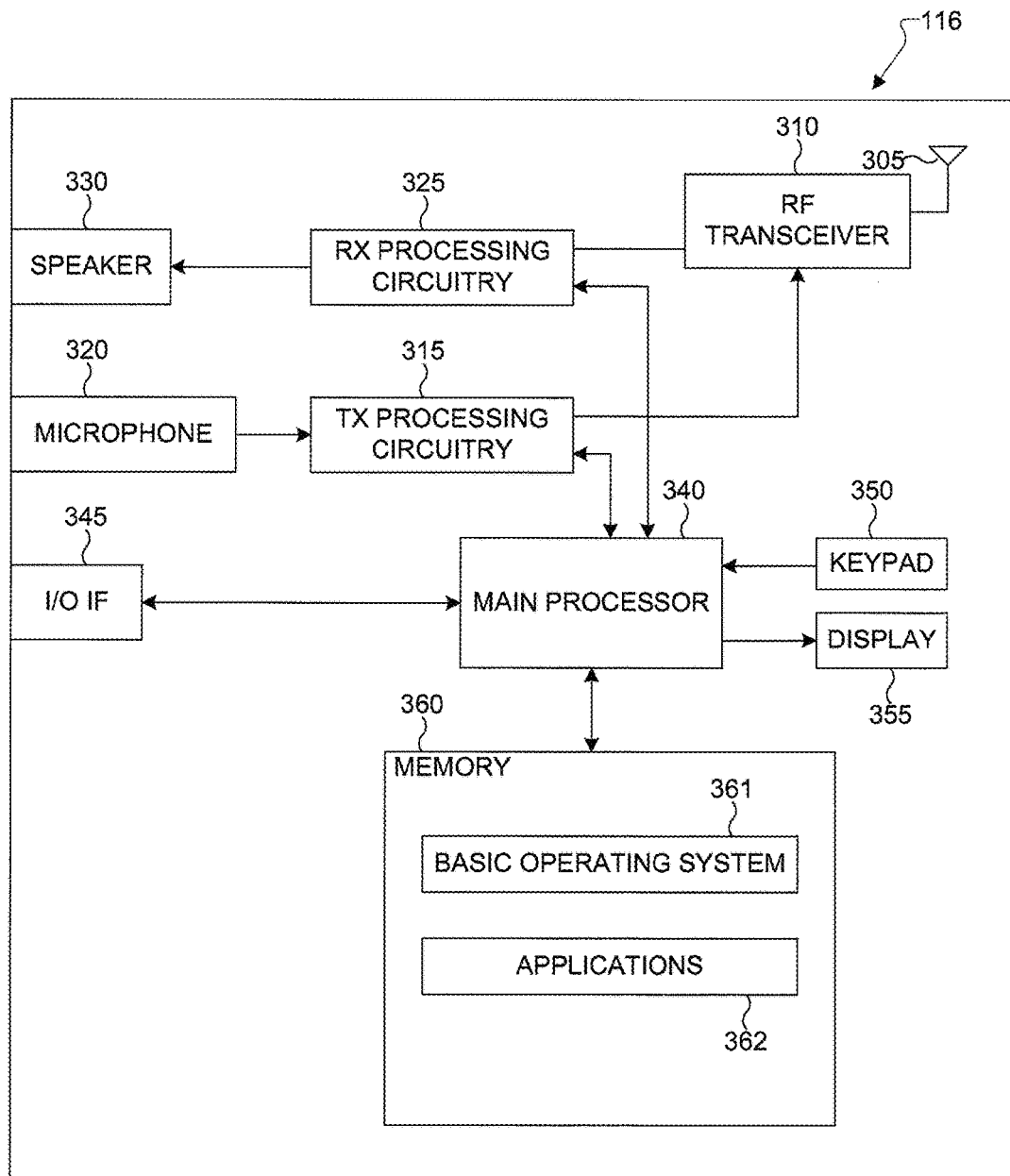
FIG. 3 illustrates an example user equipment according to this disclosure.

FIG. 3 illustrates an example UE 116 according to this disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360, such as operations for enabling native connectivity, control, and playback on the head unit of an IVI system without managing a separate SIM plan. The main processor 340 can move data into or out of the memory 360 as required by an executing process. In some embodiments, the main processor 340 is configured to execute the applications 362 based on the OS program 361 or in response to signals received from eNBs or an operator. The main processor 340 is also coupled to the I/O interface 345, which provides the UE 116 with the ability to connect to other devices such as laptop computers and handheld computers. The I/O interface 345 is the communication path between these accessories and the main controller 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
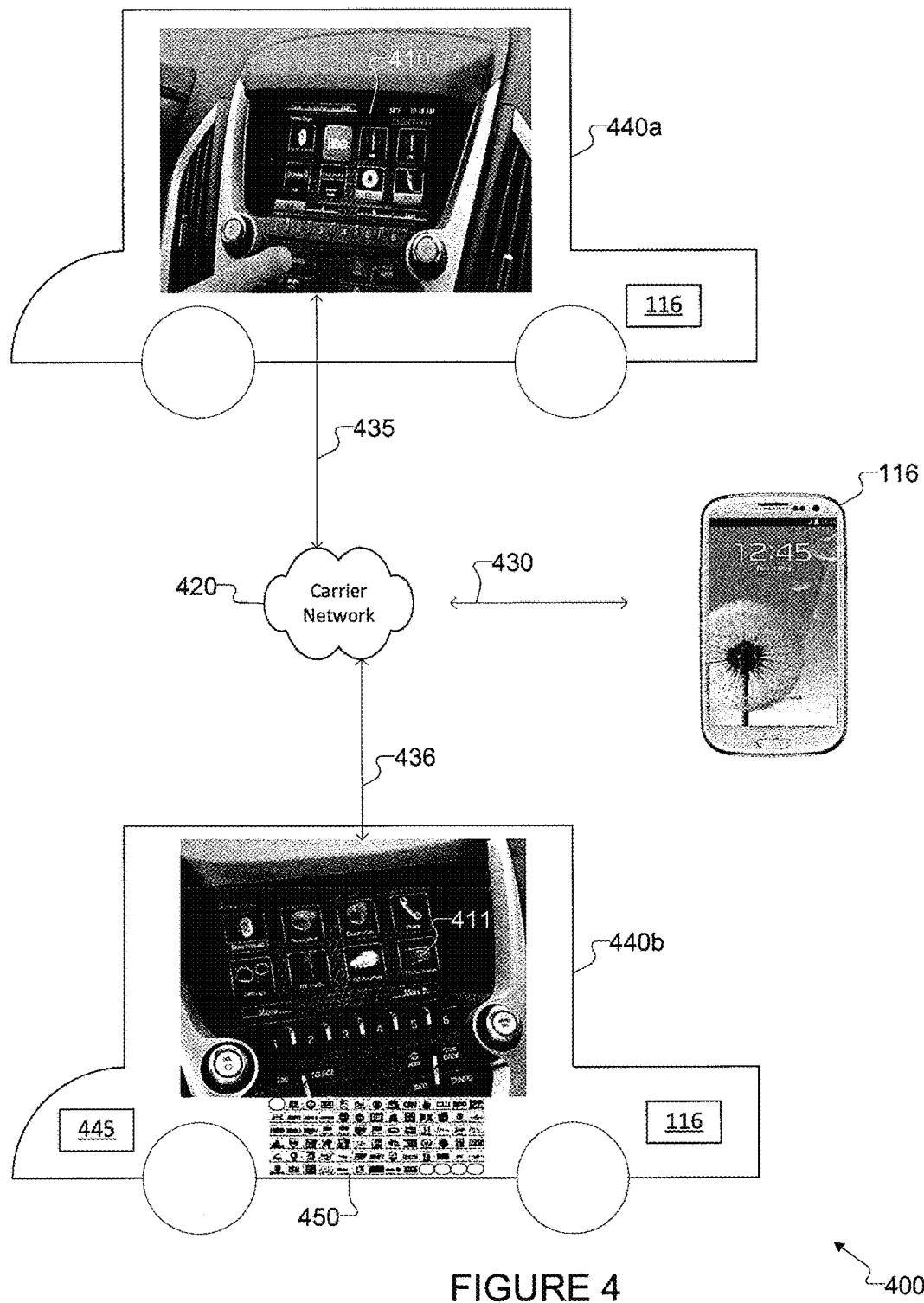
FIG. 4 illustrates an example wireless network implementing portable infotainment via dynamic subscriber identity module (SIM) twinning in connected cars according to this disclosure.

FIG. 4 illustrates an example wireless infotainment network implementing portable infotainment via dynamic subscriber identity module (SIM) twinning in connected cars according to this disclosure. The embodiment of the infotainment network 400 shown in FIG. 4 is for illustration only. Other embodiments could be used without departing from the scope of the present disclosure.

As shown in FIG. 4, the infotainment network 400 includes a mobile device 116, an IVI system 410, an IVI system 411, and a carrier network 420. The mobile device 116 communicates with the carrier network 420 through a secure over-the-air communication link 430. Each IVI system 410, 411 communicates with the carrier network 420 through an over-the-air (OTA) communication link 435, 436, respectively. The mobile device 116 is shown in three locations to illustrate that a single user carries the same mobile device 116 to various locations, including inside the vehicle 440a (for example, personal vehicle), places outside any vehicle, and inside another vehicle 440b (such as, for example, a rental car).

Twinning is the ability for the mobile device 116 to use another telecommunications device, such as a vehicle 440, to replicate, or "twin," the mobile device 116, so that when the mobile device rings, so does the "twin" phone (that is, the vehicle 440 telecommunications device). While twinning refers to being able to "twin" the mobile device 116 to one of the vehicles 440, the "twinning", or "mobile twinning" can refer to the twinning of any two mobile devices. In certain embodiments, when twinned, that is, in a twinning mode, the vehicle 440 is configured to replicate one or more data functions, such as an infotainment function, of the mobile device 116.

The user of the mobile device 116 subscribes to service plan from a carrier. In the United States of America, examples of a carrier include AT&T, VERIZON, SPRINT, and T-MOBILE. The service plan includes a voice package, such as a telephone service associated with a primary telephone number, a data package, such as a mobile broadband internet service, and a content package, such as an infotainment service. Based on the subscription to the service plan, the carrier provisions a primary SIM for service. That is, the carrier registers an identifier of the primary SIM in association with the service plan, and configures the carrier network 420, including a carrier server, to provide the voice, data, and content packages to the device containing the primary SIM.

In a normal mode, the mobile device 116 that contains the primary SIM communicates with the carrier network 420 through the OTA link 430 to make outbound telephone calls from the primary telephone number, to receive incoming telephone calls to the primary telephone number, to access the internet using mobile broadband, and to receive infotainment content, to interact with infotainment applications using the user interface of the mobile device 116. For example, interacting with infotainment applications includes selecting user preferences associated with the infotainment service.

To reduce driver distractions, when the user of the mobile device 116 is driving, in a twinning mode, the mobile device 116 that contains the primary SIM can be configured to have limited functionality. In certain embodiments, the mobile device 116 in twinning mode is disabled from communicating with the carrier network 420 through the OTA link 430. In certain embodiments, the user interface of mobile device 116 in twinning mode is limited in functionality such that the user interface of the mobile device 116 is unable to receive user input. As described more particularly below, the mobile device 116 is configured to enter the twinning mode when the user carries the mobile device 116 into a vehicle 440a, 440b.

The mobile device 116 can detect that the user carried the mobile device 116 into the vehicle 440b by receiving a control signal from the IVI system 411, where the control signal instructs the mobile device 116 to transmit an entrance notification signal via the OTA link 430. The mobile device 116 generates the entrance notification signal and includes the GPS locations of the IVI 411 and of the mobile device 116. The mobile device 116 transmits the entrance notification signal to the carrier network 420, and in response receives an assignment message from the carrier network 420. The assignment message indicates that twinning has been configured between the mobile device 116 and the IVI system 411.

In response to receiving the assignment message, the mobile device 116 enters the twinning mode. While in twinning mode, the mobile device 116 reduces driver distractions, as the mobile device 116 has limited functionality or the mobile device 116 is disabled. Also, any user preferences associated with the infotainment service that the user selected while the mobile device 116 was in normal mode will be transferred to the IVI system 411 as the user selected preferences. That is, the user does not have to select a set of preferences for use with the mobile device 116 and a re-select the set of preferences for use with the IVI system 411. Each user of the vehicle 440b can consume their own infotainment and personalize their own infotainment set of preferences on the mobile device of that user, even while the user is not in the vehicle 440b. The user of mobile device 116 has the same infotainment and personalized preferences from the IVI head unit, no matter whether he enters the vehicle 440a or 440b.

The mobile device 116 detects that the mobile device is exiting or is no longer disposed within the vehicle 440b, and in response, transmits a notification, through either direct communication channel such as Bluetooth, Bluetooth Low Energy beacon, NFC, the carrier's network 420, or the like, to the IVI system 411, instructing the IVI system 411 to transmit an exit notification and indicating that the mobile device 116 is exiting or is not disposed within the vehicle 440b. In response to receiving a twinning disconnection notification, the mobile device 116 resumes or re-enters a normal mode of operation.

As shown in FIG. 4, the head unit of the vehicle 440b includes a cellular module, together referred to as the IVI system 411. In certain embodiments, the cellular module is coupled to the head unit of a vehicle to form an IVI system, such as via a connection through a wired connection or other physical connection. That is, the IVI system 411 has an independent platform and cellular module. The IVI system 411 includes a buddy SIM card that does not have a separate service plan. That is, the buddy SIM is an active SIM, but can only be controlled by the carrier over-the-air, and does not have a separate service plan for users. The carrier network can add and remove a service plan to the buddy SIM, including voice, data, and content packages, at any time. Therefore, no personalized pre-configuration is needed for any vehicle with this IVI system 411. For example, the second vehicle 440*a* includes the same type of WI system as the vehicle 440*b*. That is, the IVI system 410 could have the same or similar configuration as the IVI system 411.

In certain embodiments, together with the carrier network 420, IVI system 411 implements a process, such as process 600 described more particularly below in reference to FIG. 6, for triggering dynamic twinning and receiving provisioning of an infotainment service over-the-air. By implementing dynamic twinning, the IVI system 411 provides portable and personalized infotainment service to the connected vehicle 440*b*. The IVI system 411 enables native connectivity, control, and playback through the head unit of the vehicle 440*b* without forcing the user to manage a separate service plan for the buddy SIM. The IVI system 411 supports multiple users and is not bound to a single user because the infotainment package of the service plan is temporarily transferred from each user's primary SIM or primary mobile device. In certain embodiments, the IVI system 411 is disposed within vehicle 440*b* and installed as part of the original equipment manufacturer (OEM) of the vehicle 440*b*. That is, the IVI system 411 can be considered as "permanent" to the vehicle 440*b*. In certain embodiments, the IVI system 411 is configured to be transferred from one vehicle 440 to another vehicle 440. That is, the IVI system 411 can be a portable device capable of being transferred between a number of vehicles 440 because the vehicle is not bound to any specific user. Accordingly, the user is not bound to any specific car. The user can enter any vehicle that supports dynamic twinning with provisioning of infotainment service over-the-air, and through the head unit of that vehicle, the user will receive personal infotainment (i.e., infotainment normally associated with the primary SIM service plan) according to the set of preferences selected by that user. The IVI system 411 dynamically receives the provisioning in a manner transparent to various users of the vehicle 440*b*.

More particularly, the IVI system 411 determines when the mobile device 116 of the user enters the vehicle 440*b*. For example, the vehicle 440*b* includes sensor 445 that transmits a beacon signal when a door of the vehicle 440*b* opens. The beacon signal is configured to prompt user equipment within the vehicle 440*b* to transmit a response. The sensor 445 can receive the response from the mobile device 116 and forward the response to the IVI system 411 indicating that that the mobile device 116 has been detected within the vehicle 440*b*.

The IVI system 411 can initiate transmission of an entrance notification to a carrier network 420 server notifying that the mobile device 116 entered the vehicle 440*b*. For example, upon the determination that the mobile device 116 is inside the vehicle 440*b*, the WI system 411 generates and transmits a control signal to the mobile device 116. The control signal instructs the mobile device 116 to transmit the entrance notification to the carrier network 420 server. The control signal can be a near field communication (NFC) signal or a BLUETOOTH signal, such as a BLUETOOTH Low Energy signal. The control signal can include GPS coordinates of the IVI system 411.

The IVI system 411 receives an assignment message from the carrier network 420 server indicating that twinning has been configured between the mobile device 116 and the WI system 411. As no service plan of user is registered to the IVI system 411, twinning with the WI system 411 includes an infotainment provisioning of the data and content packages of the service plan associated with the mobile device 116 that entered the vehicle 440*b*. That is, the user interface of the head unit of the vehicle 440*b* can be used to natively interact with the primary phone number, voice, data and content packages of the service plan associated with the mobile device 116. As an example, the head unit display of the IVI system 411 shows a menu 450 of infotainment applications representing infotainment applications implemented by the IVI head unit 411 having native control and playback for data and content associated with the primary SIM of the mobile device 116. As a technical advantage, the twinning with portable infotainment provisioned to the IVI system 411 preserves the mobile device power system and prevents mobile device 116 from being used as a display content source for the head unit display of the IVI system 411.

The IVI system 411 determines when the mobile device 116 of the user exits the vehicle 440*b*. For example, the sensor 445 that transmits a beacon signal when a door of the vehicle 440*b* opens or when a vehicle window rolls down. In another example, one or multiple sensors 445 detect the presence status of the mobile device 116 inside the vehicle 440*b*. In another example, the mobile device 116 maintains or periodically checks its presence status inside the vehicle 440*b* through short-distance communication pairing signals with the IVI system 411, such as Bluetooth, NFC, Bluetooth LE beacon, etc. When the mobile device 116 exits the vehicle 440*b* and moves away, the pairing signals are attenuated or lost, which is determined by both the IVI system 411 and the mobile device 116. In another example, the sensor 445 determines the presence status of the mobile device 116 inside the vehicle 440*b* by tracking the GPS location of the mobile device 116 and the GPS location of the IVI system 411, calculating the distance of separation, and determining whether the GPS locations are substantially the same (less than a threshold distance apart).

The IVI system 411 can initiate transmission of an exit notification to the carrier network 420 server notifying that the mobile device 116 exited the vehicle 440*b*. For example, upon the determination that the mobile device 116 is not inside the vehicle 440*b*, the IVI system 411 generates and transmits the exit notification to the carrier network 420 server. The exit notification instructs the carrier network 420 server to disconnect the twinning between the WI system 411 and the mobile device 116. The exit notification can be an uplink cellular signal, such as Long Term Evolution (LTE). The exit notification can include GPS coordinates of the IVI system 411. Alternatively, the mobile device 116 can also initiate the transmission of an exit notification.

After the carrier network 420 server disconnects the twinning between IVI system 411 and the mobile device 116, the IVI system 411 receives a twinning disconnection notification from the carrier network 420 server notifying that the disconnection is complete. In response receiving the twinning disconnection notification, the IVI system 411 can securely lock the personal data of the user in the cache or memory of the IVI system 411. In certain embodiments, such as when the vehicle 440*b* is a rental car or company-vehicle, the IVI system 411 is configured to discard all personal data of the user from the cache or memory of the IVI system 411.

The carrier network 420 includes at least one carrier server. The carrier network 420 uses carrier servers to implement the process of triggering dynamic twinning and provisioning an infotainment service over-the-air to an IVI system. In response to receiving an entrance notification from the mobile device or from the IVI system 411, the carrier network 420 locates the IVI system 411. For example, the entrance notification can include the GPS location of the mobile device 116 and the GPS location of the IVI system 411. The carrier network 420 determines to twin the buddy SIM of the IVI system 411 with the primary SIM of the mobile device 116 when the GPS locations are substantially the same (less than a threshold distance apart). The carrier network 420 can select to not twin the buddy SIM with the primary SIM based on a determination that the GPS locations are a threshold distance apart or farther.

The carrier network 420 server includes a table or database that includes a list of primary SIM cards belonging to various users who subscribe to a service plan from the carrier. For each primary SIM card listed, the table or database also includes a corresponding list of the service plans associated with that primary SIM card. For each service plan listed, the table or database includes a specification whether each service plan includes a voice package, a data package, a content package, or a combination of packages.

Upon the determination to twin the buddy SIM with the primary SIM of the mobile device 116, the carrier network 420 temporarily assigns or registers the buddy SIM of the IVI system 411 to correspond to the service plan associated with the primary SIM card within the mobile device 116. For example, in the database the carrier network 420 replaces the identifier of the primary SIM card with the buddy SIM identifier, thereby transferring the service plan from the mobile device 116 to the IVI system 411. Also, the temporary transfer of the service plan causes the carrier network 420 to perform a provisioning of the service plan to the IVI system 411.

When the temporary transfer of the service plan is complete, the carrier network 420 generates and transmits an assignment message to the mobile device 116 and to the WI system 411. The assignment message is configured to indicate that twinning with infotainment provisioning has been configured.

Upon the determination that the twinning between the buddy SIM and the primary SIM is disconnected, the carrier network 420 cancels the temporary transfer of the service plan. That is, the carrier network 420 replaces the identifier of the buddy SIM card with the identifier of the primary SIM.

When the temporary transfer of the service plan is completely disconnected, the carrier network 420 generates and transmits a twinning disconnection notification to the mobile device 116 and to the IVI system 411. The twinning disconnection notification is configured to indicate that twinning with infotainment provisioning has ceased.

Figure 5:
FIG. 5 illustrates an enlarged view of the display of the menu of infotainment applications of FIG. 4.

FIG. 5 illustrates an enlarged view of the display of the menu 450 of infotainment applications of FIG. 4. The embodiment of the menu 450 shown in FIG. 5 is for illustration only. Other embodiments could be used without departing from the scope of the present disclosure. Various media and content channels are examples of infotainment applications.

Figure 6:
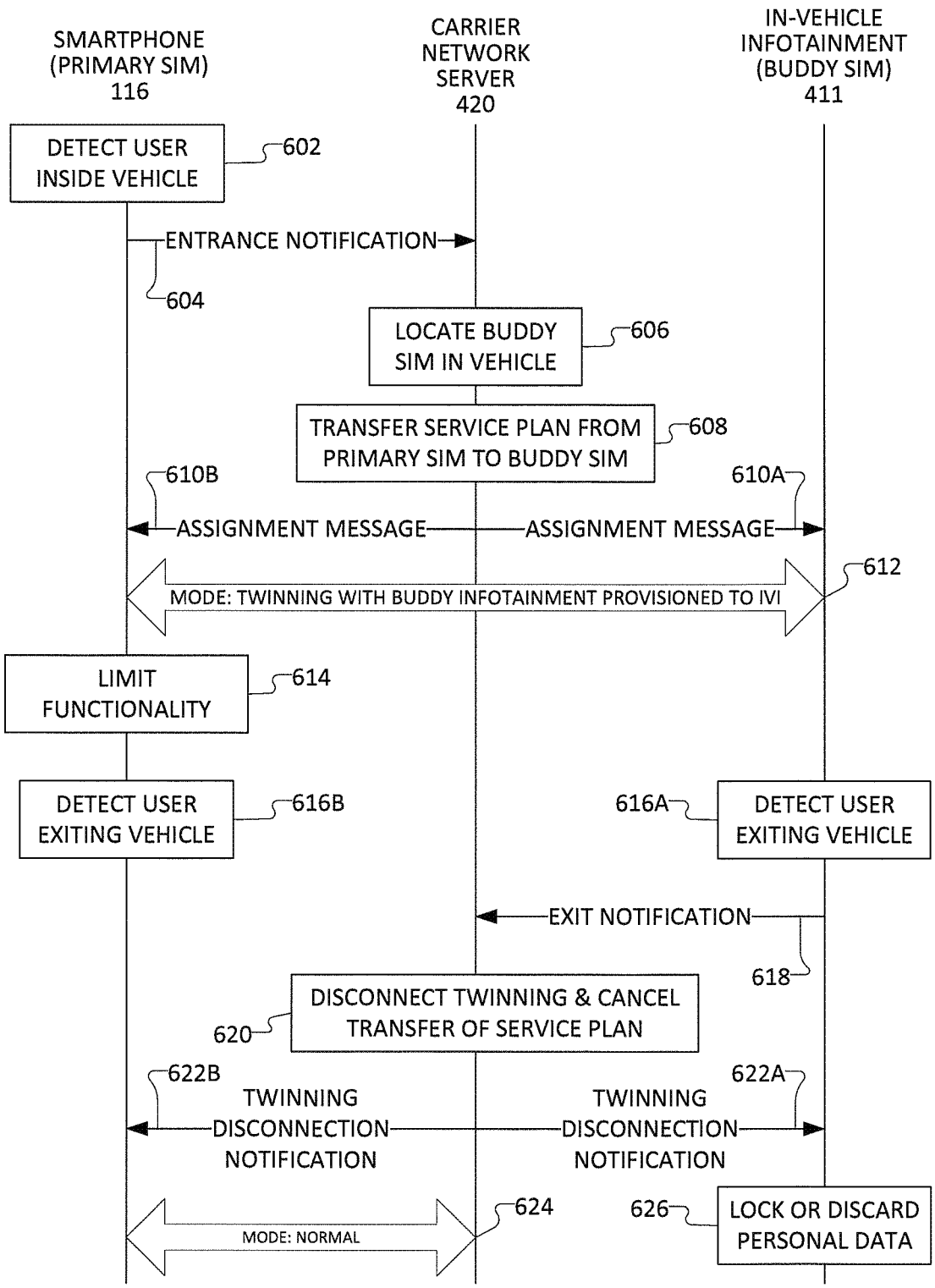
FIG. 6 illustrates a process of triggering dynamic twinning and provisioning an infotainment service over-the-air to an IVI system according to this disclosure.

FIG. 6 illustrates a process of triggering dynamic twinning and provisioning an infotainment service over-the-air to an IVI system according to this disclosure. While the flow chart depicts a series of sequential steps or signals, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process 600 is described as being implemented by the infotainment network 400.

In block 602, the mobile device 116 is detected inside a vehicle 440b. For example, the mobile device 116 can detect that the mobile device 116 is inside the vehicle 440b. In certain embodiments, the sensor 445 detects that the mobile device 116 is inside the vehicle 440b. Alternatively or simultaneously, the IVI system 411 can also detect the entrance of the mobile device 116 into inside a vehicle, such as vehicle 440b.

An entrance notification message 604 is transmitted from the mobile device 116 to the carrier network 420 through the OTA link 430. The entrance notification message 604 is configured to inform the carrier network 420 that the mobile device 116 has entered the vehicle 440b and a twinning operation is desired. Alternatively or simultaneously, the entrance notification message 604 can also be transmitted from the IVI system 411.

Alternatively, the smartphone 116 and the IVI system 411 can exchange pairing signals through short-distance communications, such as Bluetooth, Bluetooth Low Energy beacons, NFC, or the like. A common secret can be generated between the smartphone 116 and the IVI system 411. This common secret can be included in the entrance notifications 604 from both the smartphone 116 and the IVI system 411. The common secret will be later used by the carrier network 420.

Alternatively, the IVI system 411 can broadcast its buddy SIM identification through short-distance communication channels to the smartphone 116, so that the smartphone 116 can include the buddy SIM identification information in the entrance notification message 604.

In block 606, the carrier network 420 associates the buddy SIM within the WI 411 in the vehicle 440b and the primary SIM within the mobile device 116. For example, the carrier network 420 can use the common secret as the unique key to determine the pair. In another example, the carrier network 420 can find the pair if the entrance notification 604 already includes the information. In another example, the carrier network uses the GPS location of the mobile device 116 and the GPS location of the IVI system 411 within the entrance notification message 604 to associate these two SIMs, namely, the primary SIM and buddy SIM. Alternatively, the GPS location of each SIM can be obtained by the carrier network 420.

In block 608, the carrier network 420 configures a twinning between the buddy SIM within the IVI system 411 and the primary SIM within the mobile device 116. Furthermore, the carrier network 420 temporarily transfers the service plan associated with the primary SIM to the buddy SIM while the mobile device 116 is disposed within the vehicle 440b. Once the service plan transfer completes, the primary SIM within the mobile device 116 is not provisioned with the service plan. The carrier network 420 can select to transfer either the whole service plan or certain parts of the service plan. For example, if the service plan associated with the primary SIM includes a combination of three packages, such as data, content, and phone packages, then the carrier network 420 can select to transfer only one, only two, or all three of the three packages.

The carrier network 420 transmits an assignment message 610a to the IVI 411 and an assignment message 610b to the mobile device 116. The assignment message 610a is transmitted from the carrier network 420 to the IVI system 411 through the OTA link 436. The assignment message 610a is transmitted from the carrier network 420 to the mobile device 116 through the OTA link 430. In response to receiving the assignment messages 610a and 610b the IVI system 411 and the mobile device 116 operate in a twinning mode, shown by the mode arrow 612.

During the twinning mode 612, any phone, data, or content packages normally registered to the primary SIM are temporarily provisioned to the buddy SIM. That is, during twinning mode, the user interface of the head unit and the head unit display of the IVI system 411 are used to interact with the phone number, voice, data, or content packages of the service plan associated with (for example, normally provisioned to) the primary SIM of the mobile device 116.

In block 614, the mobile device 116 limits the functionality of the mobile device 116. For example, in response to receiving the assignment message 610b, the mobile device 116 disables the user input interface. That is, a user driving the vehicle 440b cannot interact with the mobile device 116 while the device 116 is in twinning mode.

When the mobile device 116 is removed from the vehicle, such as when the user leaves the vehicle with the mobile device 116 in their possession, one or both the mobile device and sensor detect that the mobile device 116 is outside the vehicle 440b. For example, in block 616a, the sensor 445 detects that the mobile device 116 is outside the vehicle 440b. In block 616b, the mobile device 116 detects that the mobile device 116 is outside the vehicle 440b. In block 616b, the mobile device 116 can transmit a notification through any short-distance communication channel (such as NFC, Bluetooth, Bluetooth LE beacon, etc.), or through the carrier network 420 to the IVI system 411 informing that the mobile device is exiting 116 or has exited the vehicle 440b.

Thereafter, an exit notification message 618 that is transmitted from the WI system 411 to the carrier network 420 through the OTA link 436. That is, twinning will be disconnected once the vehicle 440b and the mobile device 116 detect that the user is stepping out of the vehicle 440b. Alternatively, the exit notification message can also be transmitted from the mobile device 116.

In block 620, the carrier network 420 disconnects the twinning between the buddy SIM within the IVI system 411 and the primary SIM within the mobile device 116. Furthermore, the carrier network cancels the temporary transfer of the service plan. The carrier network 420 modifies the tables or databases within the carrier network server to re-assign the service plan to the primary SIM within the mobile device 116.

The carrier network 420 transmits a twinning disconnection notification 622a that to the IVI system 411 through the OTA link 436. The carrier network 420 also transmits a twinning disconnection notification 622b to the mobile device 116 through the OTA link 430. The twinning disconnection notifications 622a and 622b notify IVI 411 and the mobile device 116 respectively that the disconnection of the twinning is complete. The twinning disconnection notification 622b can include a provisioning of the service plan to the primary SIM.

In the block 624, the mobile device 116 enters the normal operation mode. For example, in response to receiving the twinning disconnection notification 622b, the mobile device 116 re-enables the functionality of the user input interface. Also, the mobile device 116 uses the phone, data, and content packages of the service plan through the OTA link 430.

In the block 626, in response to receiving the twinning disconnection notification 622a, the IVI system 411 locks or discards the personal information of the user of the mobile device 116 in the cache of the IVI system 411. In certain embodiments, the IVI system can select to either securely lock or completely delete personal information from the cache.

Although various features have been shown in the figures and described above, various changes may be made to the figures. For example, the size, shape, arrangement, and layout of components shown in FIGS. 1 through 5 are for illustration only. Each component could have any suitable size, shape, and dimensions, and multiple components could have any suitable arrangement and layout. Also, various components in FIGS. 1 through 5 could be combined, further subdivided, or omitted and additional components could be added according to particular needs. Further, each component in a device or system could be implemented using any suitable structure(s) for performing the described function(s). In addition, while FIG. 5, 6 illustrate various series of steps and signals, various steps in FIG. 6 could overlap, occur in parallel, occur multiple times, or occur in a different order.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus comprising:
processing circuitry configured to:
   determine that a primary user equipment (UE) entered a vehicle;
   initiate transmission of an entrance notification to a carrier network server notifying that the primary UE entered the vehicle;
   receive an assignment message from the carrier network server, the assignment message indicating that twinning has been configured between the primary UE and the apparatus,
wherein the twinning configuration includes a transfer of assignment of a service plan corresponding to the primary UE from the primary UE to the apparatus.

2. The apparatus of claim 1, wherein determining that the primary UE entered the vehicle comprises receiving a short-distance communication from the primary UE.

3. The apparatus of claim 1, wherein initiating transmission of the entrance notification comprises causing the primary UE to transmit the entrance notification to the carrier network server.

4. The apparatus of claim 1, further configured to: in response to receiving the assignment message from the carrier network server, implement a personal infotainment package of the service plan corresponding to the primary UE.

5. The apparatus of claim 1, further configured to:
   determine that the primary UE exited the vehicle;
   initiate transmission of an exit notification to the carrier network server notifying that the primary UE exited the vehicle;
   receive a twinning disconnection notification from the carrier network server notifying that the service plan corresponding to the primary UE has ceased being transferred to the apparatus.

6. The apparatus of claim 5, wherein initiating transmission of the exit notification comprises causing the primary UE to transmit the exit notification to the carrier network server.

7. The apparatus of claim 5, further configured to: in response to receiving the twinning disconnection notification, securely lock personal data associated with the primary UE in a cache within the apparatus.

8. The apparatus of claim 5, further configured to: in response to receiving the twinning disconnection notification, discard personal data associated with the primary UE from a cache within the apparatus.

9. A system comprising:
 a carrier network server including processing circuitry configured to:
  receive an entrance notification notifying that a primary user equipment (UE) entered a vehicle;
  locate a buddy Subscriber Identity Module (SIM) in the vehicle;
  twin the buddy SIM with a primary SIM within the primary UE; and
  initiate transmission of an assignment message from the carrier network server to an In-vehicle infotainment (IVI) unit having the buddy SIM, the assignment message indicating that twinning has been configured between the primary UE and the buddy SIM,
 wherein the twinning configuration includes a transfer of assignment, by the carrier network server, of a service plan corresponding to the primary UE from the primary SIM to the buddy SIM.

10. The system of claim 9, wherein the entrance notification is received from the primary UE.

11. The system of claim 9, wherein the entrance notification is received from an in-vehicle infotainment unit coupled to the buddy SIM in the vehicle.

12. The system of claim 9, wherein twinning the buddy SIM with the primary SIM comprises: transferring the service plan corresponding to the primary UE to an in-vehicle infotainment unit coupled to the buddy SIM in the vehicle.

13. The system of claim 9, wherein the processing circuitry is further configured to:
 receive an exit notification notifying that the primary UE exited the vehicle;
 in response to receiving the exit notification, disconnect the twinning between the buddy SIM and the primary SIM by ceasing the transfer of assignment.

14. The system of claim 13, wherein the processing circuitry is further configured to: initiate transmission of a twinning disconnection notification notifying that the service plan corresponding to the primary UE has ceased being transferred to the IVI unit.

15. The system of claim 14, wherein the twinning disconnection notification notifies that the service plan has been transferred to the primary UE, and
 wherein the twinning disconnection notification is initiated for transmission to at least one of: the primary UE and the IVI unit.

16. A method comprising:
 receiving an entrance notification notifying that a primary user equipment (UE) entered a vehicle;
 locating a buddy Subscriber Identity Module (SIM) in the vehicle;
 twining the buddy SIM with a primary SIM within the primary UE; and
 initiating, by a carrier network server, transmission of an assignment message to an In-vehicle infotainment (IVI) unit having the buddy SIM, the assignment message indicating that twinning has been configured between the primary UE and the buddy SIM,
 wherein the twinning configuration includes a transfer of assignment, by the carrier network server, of a service plan corresponding to the primary UE from the primary SIM to the buddy SIM.

17. The method of claim 16, wherein the entrance notification is received from at least one of:
 the primary UE, and
 an in-vehicle infotainment unit coupled to the buddy SIM in the vehicle.

18. The method of claim 16, wherein twinning the buddy SIM with the primary SIM comprises: transferring the service plan corresponding to the primary UE to an in-vehicle infotainment unit coupled to the buddy SIM in the vehicle.

19. The method of claim 16, further comprising:
 receiving an exit notification notifying that the primary UE exited the vehicle;
 in response to receiving the exit notification, disconnecting the twinning between the buddy SIM and the primary SIM and ceasing the transfer of assignment.

20. The method of claim 19, further comprising: initiating transmission of a twinning disconnection notification notifying that the service plan corresponding to the primary UE has ceased being transferred to the IVI unit,
 wherein the twinning disconnection notification notifies that the service plan has been transferred to the primary UE, and
 wherein the twinning disconnection notification is initiated for transmission to at least one of: the primary UE and the IVI unit.

* * * * *